United States Patent
Gaspard, II et al.

(10) Patent No.: US 11,852,411 B2
(45) Date of Patent: Dec. 26, 2023

(54) MOBILE KILN SYSTEM

(71) Applicant: Mobile Biochar Solutions LLC, Loveland, CO (US)

(72) Inventors: James G. Gaspard, II, Loveland, CO (US); Matthew J. Chase, Windsor, CO (US); John Clay, Loveland, CO (US)

(73) Assignee: MOBILE BIOCHAR SOLUTIONS LLC, Loveland, CO (US)

( * ) Notice: Subject to any disclaimer, the term of this patent is extended or adjusted under 35 U.S.C. 154(b) by 36 days.

(21) Appl. No.: 17/446,620

(22) Filed: Sep. 1, 2021

(65) Prior Publication Data

US 2022/0074666 A1    Mar. 10, 2022

Related U.S. Application Data

(60) Provisional application No. 62/706,714, filed on Sep. 4, 2020.

(51) Int. Cl.

| | | |
|---|---|---|
| *C10B 1/02* | (2006.01) | |
| *C10B 53/02* | (2006.01) | |
| *F27B 14/02* | (2006.01) | |
| *F27B 14/14* | (2006.01) | |
| *F27B 14/08* | (2006.01) | |
| *F27B 14/12* | (2006.01) | |
| *F23J 11/08* | (2006.01) | |
| *F27D 1/00* | (2006.01) | |
| *F27D 3/00* | (2006.01) | |
| *F27D 1/18* | (2006.01) | |

(52) U.S. Cl.
CPC ............. *F27B 14/02* (2013.01); *C10B 1/02* (2013.01); *C10B 53/02* (2013.01); *F23J 11/08* (2013.01); *F27B 14/0806* (2013.01); *F27B 14/12* (2013.01); *F27B 14/143* (2013.01); *F27B 2014/0831* (2013.01); *F27B 2014/0881* (2013.01); *F27D 2001/0066* (2013.01); *F27D 2001/1825* (2013.01); *F27D 2003/0089* (2013.01)

(58) Field of Classification Search
CPC .................................................... C10B 53/02
See application file for complete search history.

(56) References Cited

U.S. PATENT DOCUMENTS

| | | | | |
|---|---|---|---|---|
| 1,070,666 | A * | 8/1913 | Carr ......................... | C10B 1/04 |
| | | | | 202/124 |
| 2,159,310 | A * | 5/1939 | Bang ....................... | C10B 53/02 |
| | | | | 202/213 |
| 9,752,078 | B2 * | 9/2017 | Aupperle .................. | C10B 1/02 |
| 10,160,911 | B2 * | 12/2018 | Aupperle ................ | C10B 49/02 |
| 10,253,979 | B2 * | 4/2019 | Aupperle ................ | C10B 53/02 |

(Continued)

*Primary Examiner* — Jonathan Luke Pilcher
(74) *Attorney, Agent, or Firm* — Trenner Law Firm, LLC; Mark Trenner

(57) ABSTRACT

An example mobile kiln system includes a mobile platform. A frame is mounted to the mobile platform. At least one kiln is rotatably mounted to the frame. The kiln is movable between a first operational position for loading a feed material into the at least one kiln, and a second operational position for unloading a biochar product from the at least one kiln following processing of the feed material. In an example, the mobile kiln system includes at least one stack assembly for the kiln. The stack assembly has a lid to cover the kiln to retain heat and a chimney to release emissions from the kiln during processing of the feed material.

19 Claims, 8 Drawing Sheets

(56) References Cited

U.S. PATENT DOCUMENTS

| | | | |
|---|---|---|---|
| 10,323,845 B2* | 6/2019 | Aupperle | F23L 5/02 |
| 10,370,593 B2* | 8/2019 | Aupperle | C10B 49/02 |
| 10,385,273 B2* | 8/2019 | Olander | C10B 1/02 |
| 10,385,274 B2* | 8/2019 | Olander | F23G 5/0276 |
| 10,527,282 B2* | 1/2020 | Aupperle | F23G 7/07 |
| 10,751,885 B2* | 8/2020 | Olander | C10B 25/14 |
| 10,883,052 B2* | 1/2021 | Olander | C10B 1/02 |
| 11,135,728 B2* | 10/2021 | Olander | C10B 25/22 |
| 2015/0040804 A1* | 2/2015 | Aupperle | F23L 17/005 110/309 |
| 2015/0136581 A1* | 5/2015 | Aupperle | C10B 41/04 202/270 |
| 2017/0283703 A1* | 10/2017 | Olander | C10B 1/02 |
| 2017/0283704 A1* | 10/2017 | Olander | C10B 53/02 |
| 2017/0369785 A1* | 12/2017 | Aupperle | F23L 3/00 |
| 2018/0072953 A1* | 3/2018 | Aupperle | C10B 1/02 |
| 2018/0072954 A1* | 3/2018 | Aupperle | F23B 90/06 |
| 2018/0282628 A1* | 10/2018 | Aupperle | F23L 5/02 |
| 2018/0282629 A1* | 10/2018 | Aupperle | F23G 7/10 |
| 2018/0282630 A1* | 10/2018 | Aupperle | F23B 90/06 |
| 2019/0030725 A1* | 1/2019 | Olander | B25J 15/00 |
| 2019/0330533 A1* | 10/2019 | Olander | F23L 1/02 |
| 2020/0078956 A1* | 3/2020 | Olander | B25J 15/00 |
| 2022/0161461 A1* | 5/2022 | Gaspard, II | B29B 17/04 |

* cited by examiner

MOBILE KILN SYSTEM

PRIORITY CLAIM

This application claims the priority filing benefit of U.S. Provisional Patent Application No. 62/706,714 filed Sep. 4, 2020 for "Mobile Kiln System" of James G. Gaspard II, et al., hereby incorporated by reference for all that is disclosed as though fully set forth herein.

BACKGROUND

Biochar is taking on increased interest with the abundance of source material (e.g., beetle kill forests) and new innovations for the end product (e.g., environmental clean-up, agricultural uses, etc.). However, it can be expensive to transport the source material to a processing facility. As such, these facilities have to be constructed at least somewhat near the source material to reduce these costs and make biochar production cost-effective. When the source material runs out, the facility has to be dismantled and moved to a new location, or abandoned. Both options leave an undesirable footprint on the landscape.

DETAILED DESCRIPTION

A mobile kiln system is disclosed as it may be operated to produce a biochar product from feedstock, such as beetle kill pine trees or other plant material. An example mobile kiln system includes a mobile platform. A frame is mounted to the mobile platform. At least one kiln is rotatably mounted to the frame. The kiln is movable between a first operational position for loading a feed material into the at least one kiln, and a second operational position for unloading a biochar product from the at least one kiln following processing of the feed material. In an example, the mobile kiln system includes at least one stack assembly for the kiln. The stack assembly has a lid to cover the kiln to retain heat and a chimney to release emissions from the kiln during processing of the feed material.

The example mobile kiln system is shown as it may be configured for transport by a "lowboy" trailer for use on-site (e.g., where trees or other biochar source product is available). Other transport mechanisms (e.g., trailers, or built-on the truck) are also contemplated. The mobile kiln system thus reduces time and costs associated with transporting the biochar source product to the biochar kilns.

In an example, the system is self contained. That is, it can be fully isolated from "shore" power, with both power and fuel for the conversion process. A frame subsystem can be easily lowered on and off of a trailer. In an example operating configuration, the frame subsystem also provides the option to be permanently attached to a dedicated trailer.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

Figure 1:
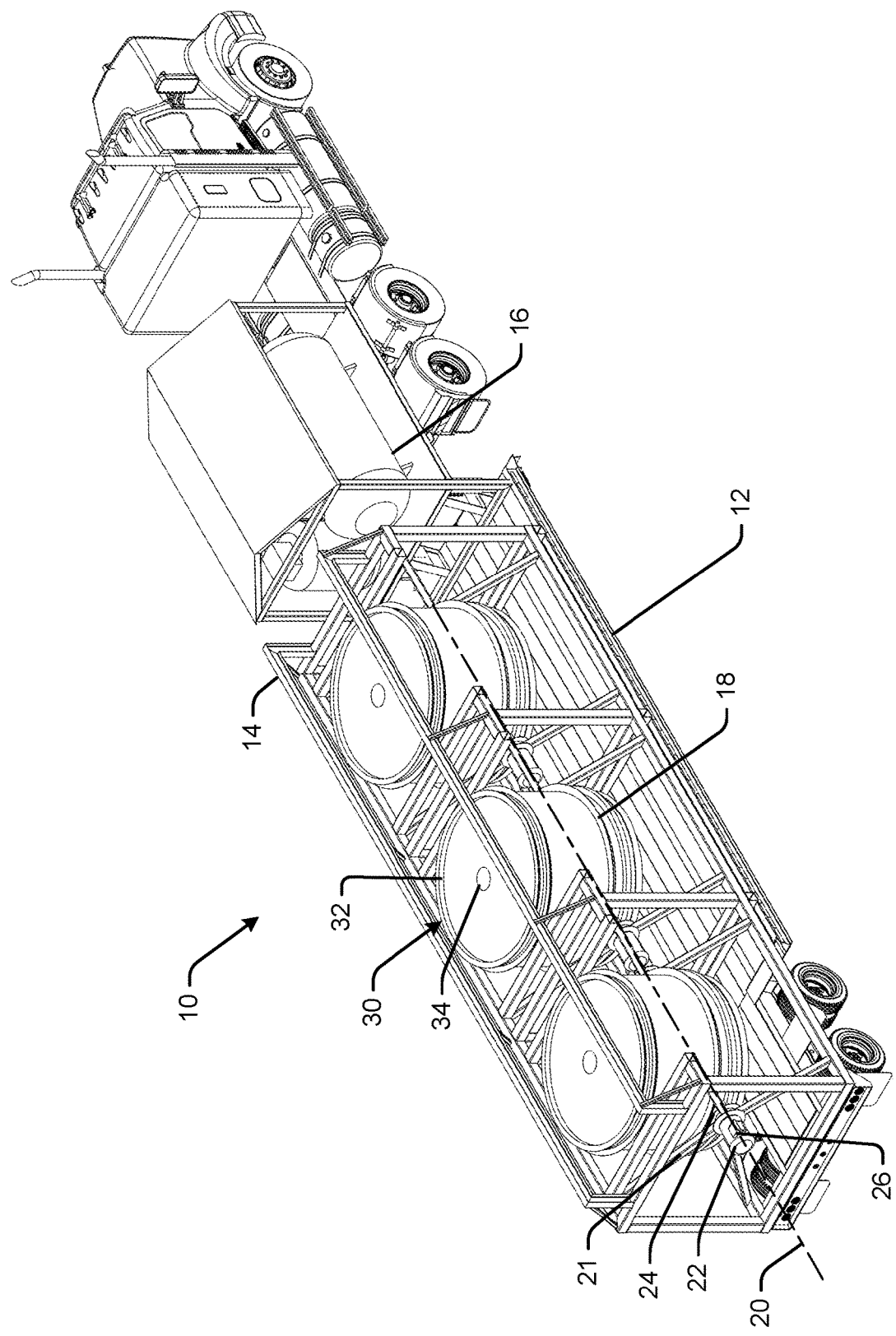
FIG. 1 is a perspective view of an example mobile kiln system.
Figure 2:
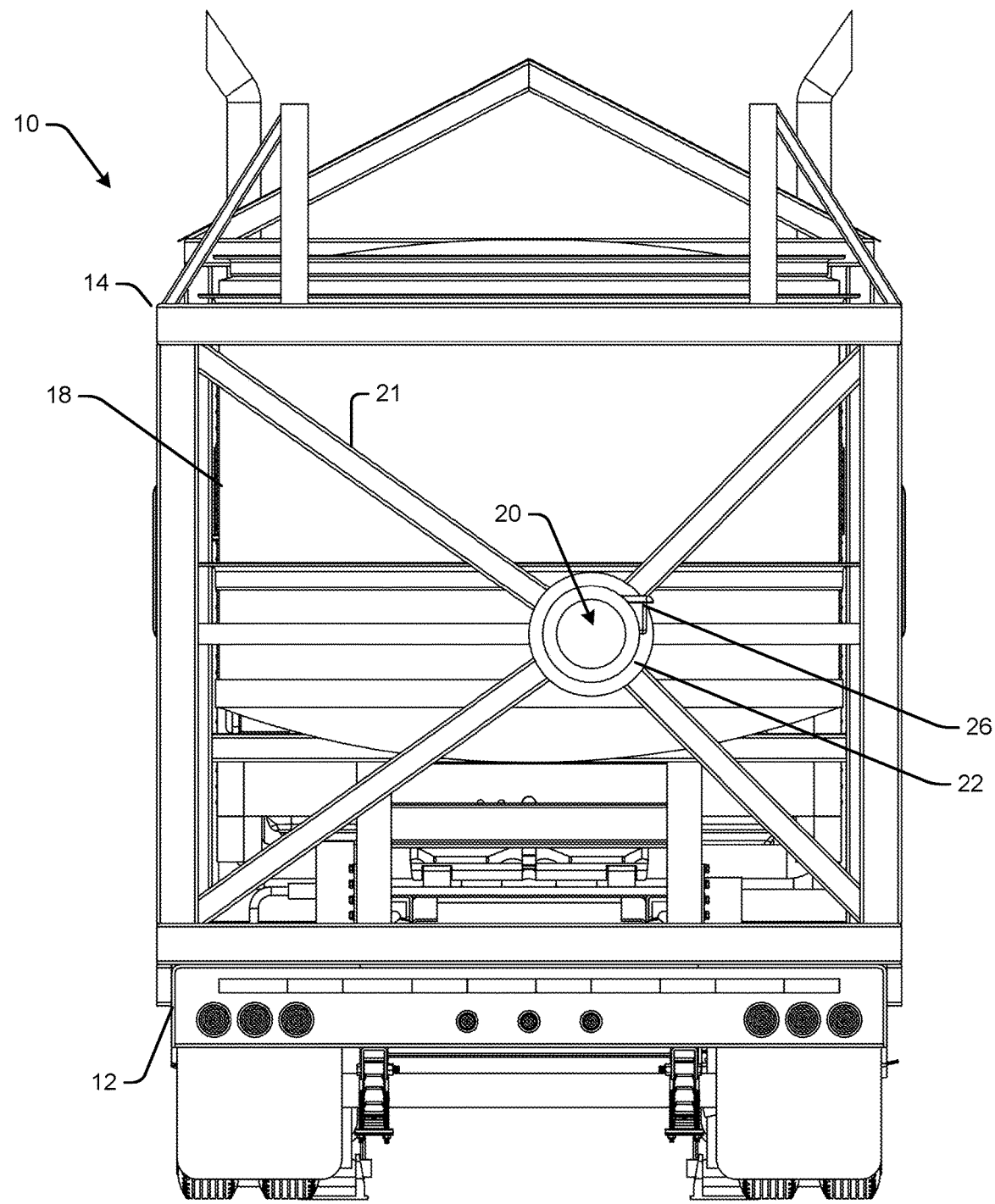
FIG. 2 is a back view of the example mobile kiln system shown in FIG. 1.

FIG. 1 is a perspective view of an example mobile kiln system 10. FIG. 2 is a back view of the example mobile kiln system 10 shown in FIG. 1. An example of a mobile kiln system 10 includes a mobile platform 12, and a frame 14 mounted to the mobile platform 12. The mobile platform 12 may be a trailer (e.g., a flatbed or "lowboy" trailer), a truck (e.g., a flatbed truck or a specially designed truck including the mobile platform), a skid, a float, or any other platform for transporting the frame and mobile kiln system 10 between sites for processing and/or delivering biochar.

In an example, the frame 14 is removable from the mobile platform 12 and remains fully operational apart from the mobile platform 12 for biochar production.

In an example, a fuel supply 16 may be provided on the mobile platform so that the mobile kiln system is self-sustained. The fuel supply 16 (e.g., propane) may be connected to one or more of the kiln(s) 18, at least during a burn phase of biochar production.

At least one kiln 18 is rotatably mounted to the frame 14. The kiln 18 is mounted to the frame 14 to be movable between a first operational position for loading a feed material into the kiln 18 (e.g., FIG. 7), and a second operational position for unloading a biochar product from the kiln 18 following processing of the feed material (e.g., FIG. 8).

In an example, the kiln 18 is mounted to an elevated support axis 20 rotatably mounting the kiln (or kilns) 18 to the frame 14. The elevated support axis 20 supports the kilns on the frame 14 in the first operational position and the second operational position.

In an example, the elevated support axis 20 includes a first shaft hub 22 mounted to a cross member 21 on the frame 14, and a second shaft hub 24 mounted to either side of the kiln 18. A shaft extends between the shaft hubs 22 and 24 to enable rotation.

A drive system 26 may be operated to rotate one or more kiln 18 on the elevated support axis 20 between the first operational position and the second operational position. In an example the drive system 26 includes a motor. Examples of the motor include but are not limited to a direct drive, gear driven, chain or belt driven motor.

Figure 3:
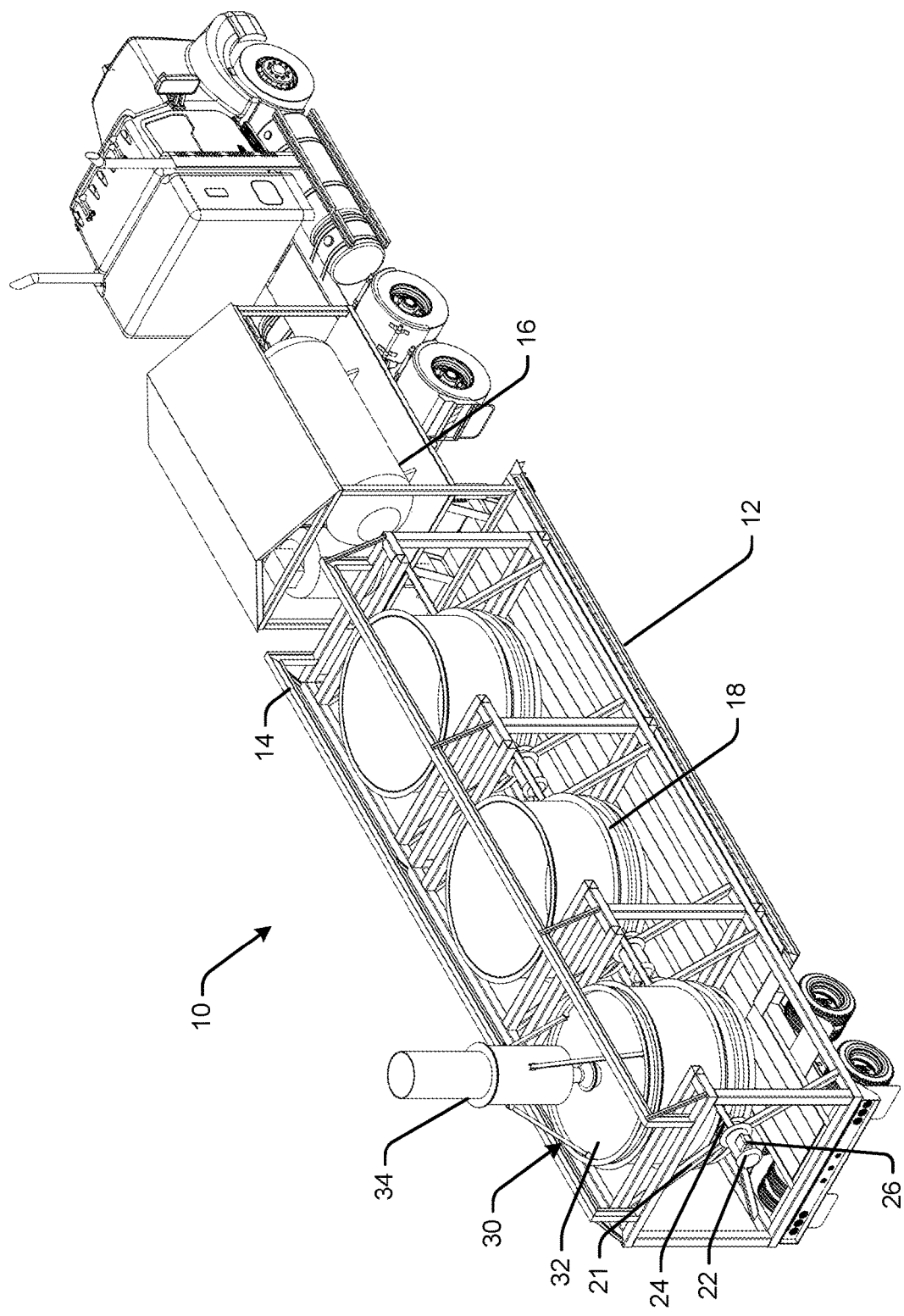
FIG. 3 is a perspective view of the example mobile kiln system showing a stack assembly on a first kiln.

In an example, the mobile kiln system 10 includes at least one stack assembly 30 for the at least one kiln 18. An example stack assembly 30 has a lid 32 to cover the kiln body to retain heat therein, and a chimney or other exhaust port 34 to release emissions from the kiln 18 during processing of the feed material. In an example, the stack assembly 30 is positionable on the kiln 18 in an operating configuration (e.g., chimney up as seen in FIG. 3), and a transport configuration (e.g., chimney down as seen in FIG.

1). The chimney 34 moves about 180 degrees (e.g., upright to upside down) between the operating configuration and the transport configuration.

In an example, the mobile kiln system 10 includes a dedicated stack assembly 30 for each of a plurality of kilns mounted to the frame. In another example, a single stack assembly 30 is provided on a guide track to move between a plurality of kilns mounted to the frame. The guide track may have one or more rail and corresponding rail engagement device. The corresponding rail engagement device may include at least one wheel to roll on the at least one guide track. In another example, the corresponding rail engagement device includes at least one slider to slide on the guide track.

In an example, a drive mechanism automatically moves the stack assembly between the plurality of kilns. The drive mechanism may include one or more motor and drive chain or drive belt to move the stack assembly 30.

Figure 4:
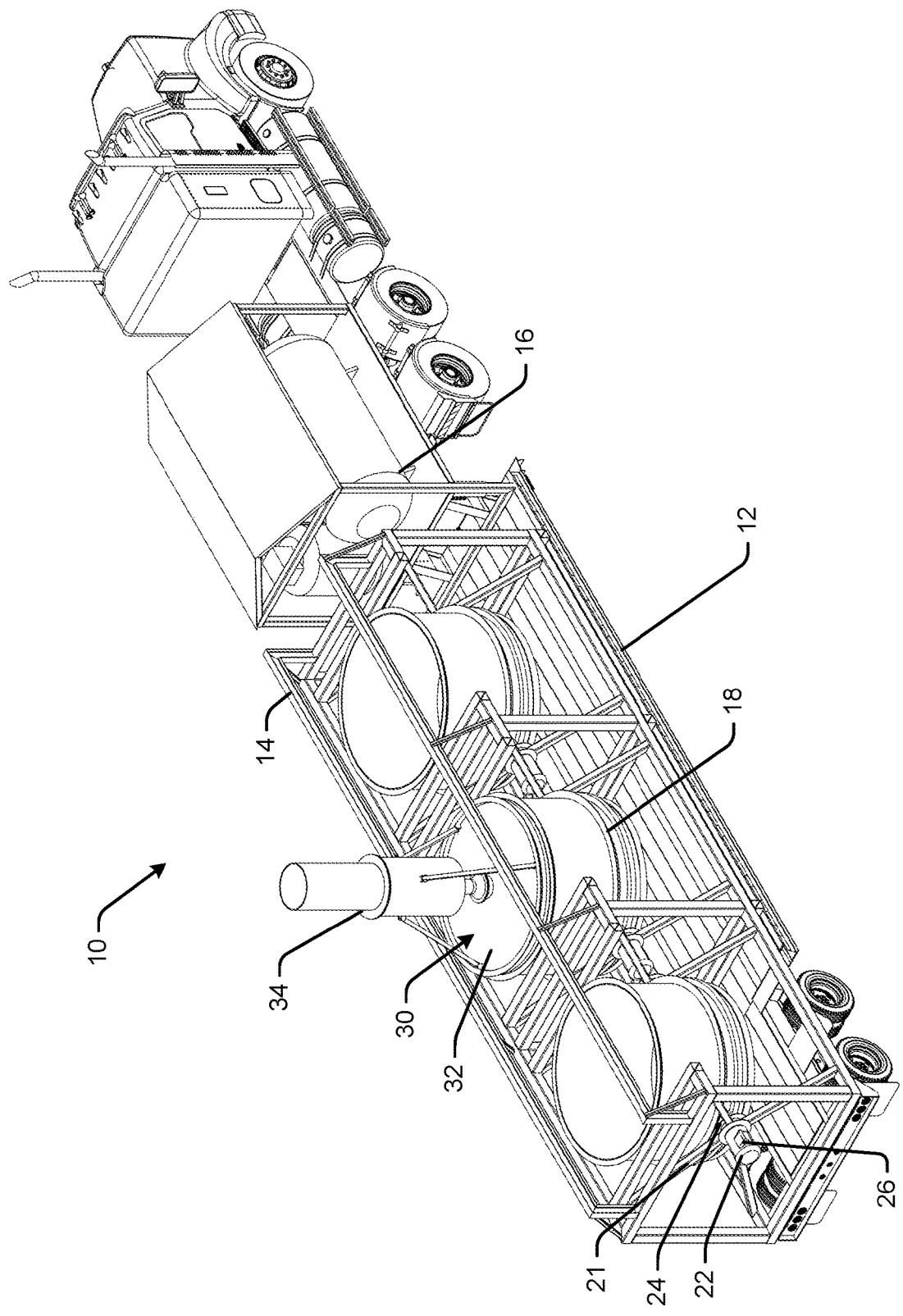
FIG. 4 is a perspective view of the example mobile kiln system showing the stack assembly moved to a second kiln.

FIG. 3 is a perspective view of the example mobile kiln system 10 showing a stack assembly 30 on a first kiln 18. FIG. 4 is a perspective view of the example mobile kiln system 10 showing the stack assembly 30 moved to a second kiln 18. The stack assembly 30 may also be moved to the third kiln 18, or some or as many kilns as provided.

In an example, a three kiln 18 configuration (such as that shown in the drawings) is best suited for the most efficient processing of the biochar burn cycle and subsequent cooling cycle of the biochar production. The configuration is laid out in a line so that it fits within standard shipping requirements for transportation on highways, rail, or ship.

The frame 14 may be structured to support the kiln rotation pins 22 of the support axis 20, and the overall outside geometry of the frame 14, so that the kilns 18 can be suspended from the frame 14. This structure allows for the lower portion of a traditional kiln 18 to be removed and all kilns 18 to be supported by the frame 14 for transport via the mobile kiln system 10. The frame 14 also allows for the kilns 18 to be rotated and emptied within the frame structure 14, together or each independently, after the completion of the cooling cycle of the biochar.

Figure 5:
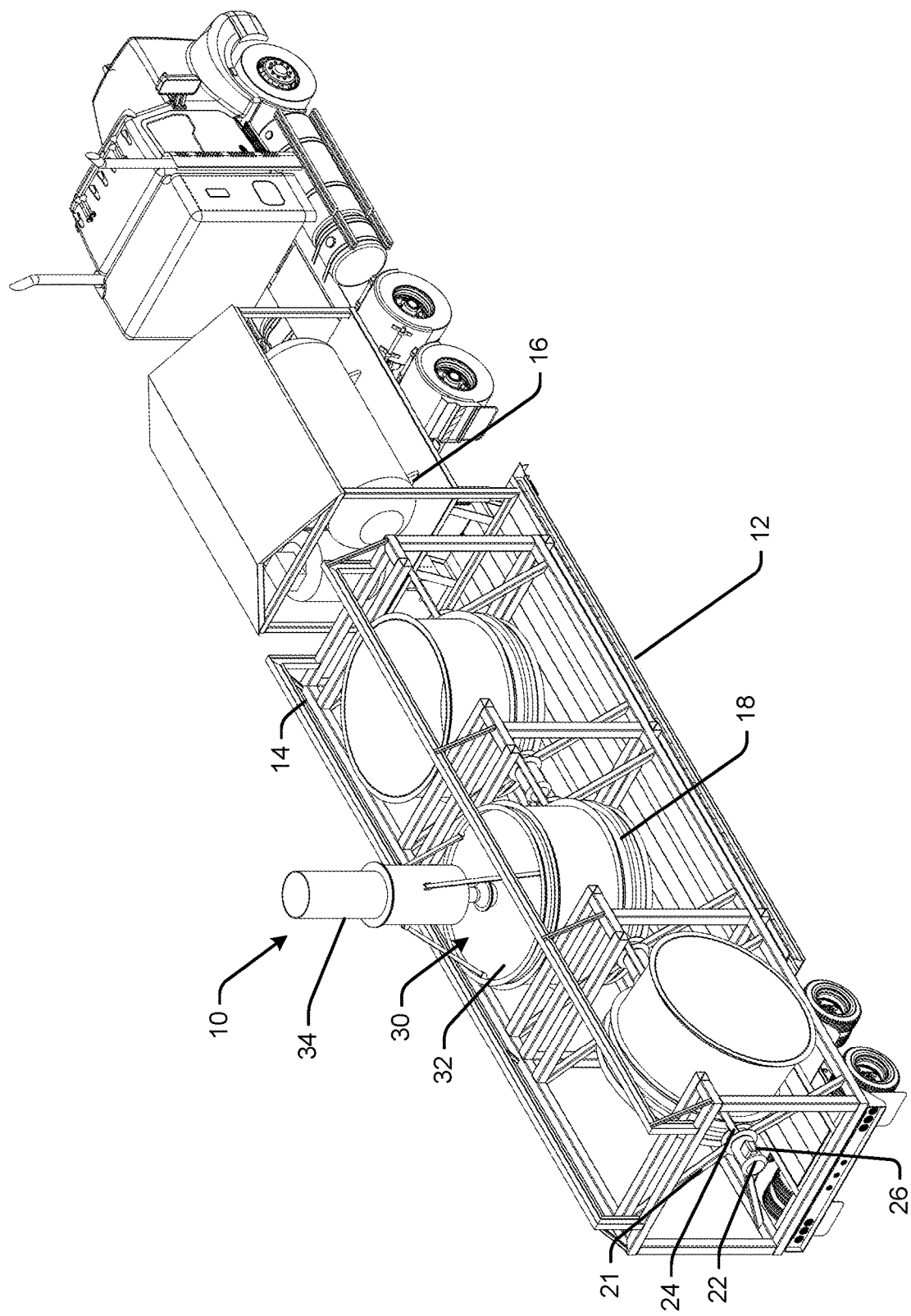
FIG. 5 is a perspective view of the example mobile kiln system showing the first kiln in a tipped position to empty biochar from the first kiln.
Figure 6:
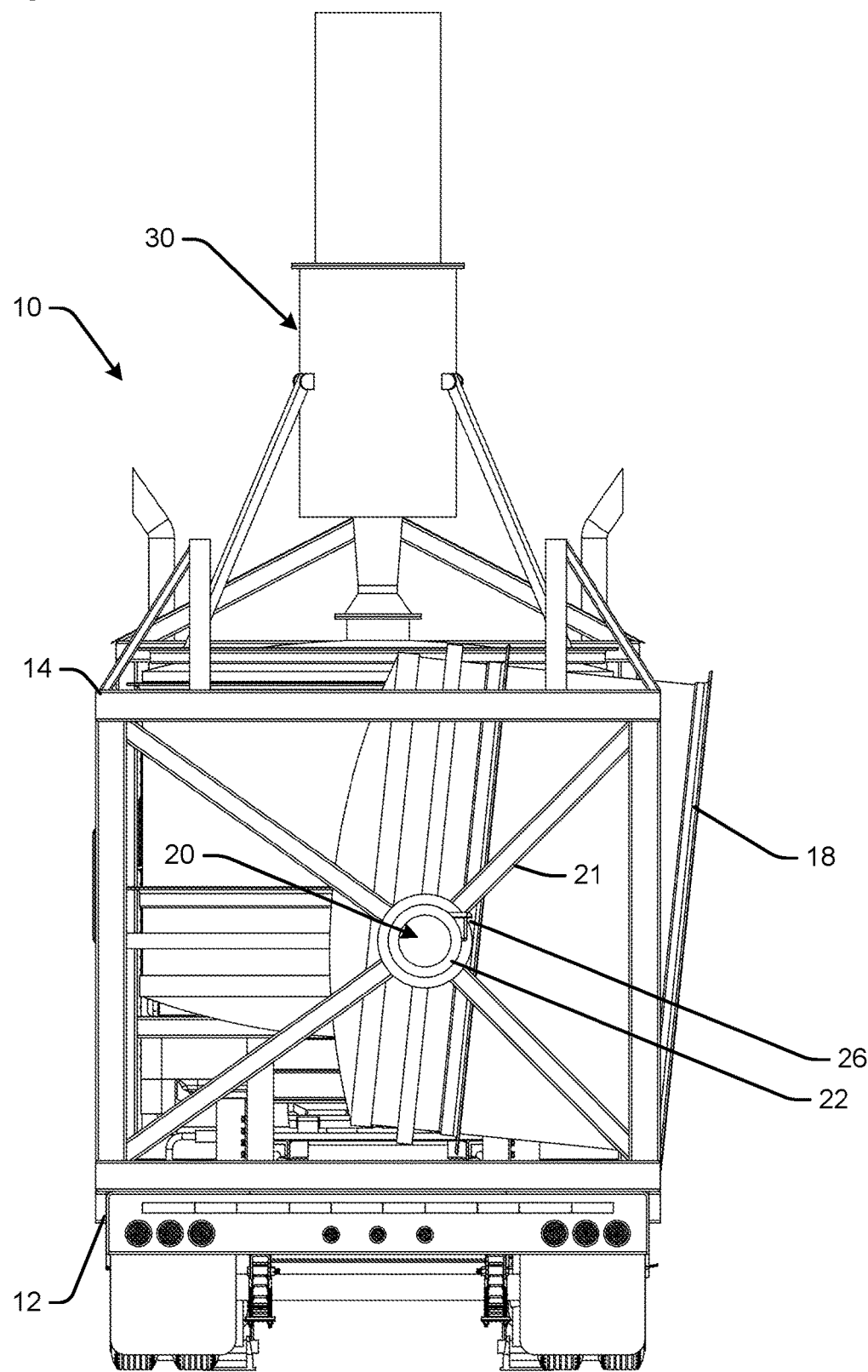
FIG. 6 is a back view of the example mobile kiln system corresponding to FIG. 5.
Figure 7:
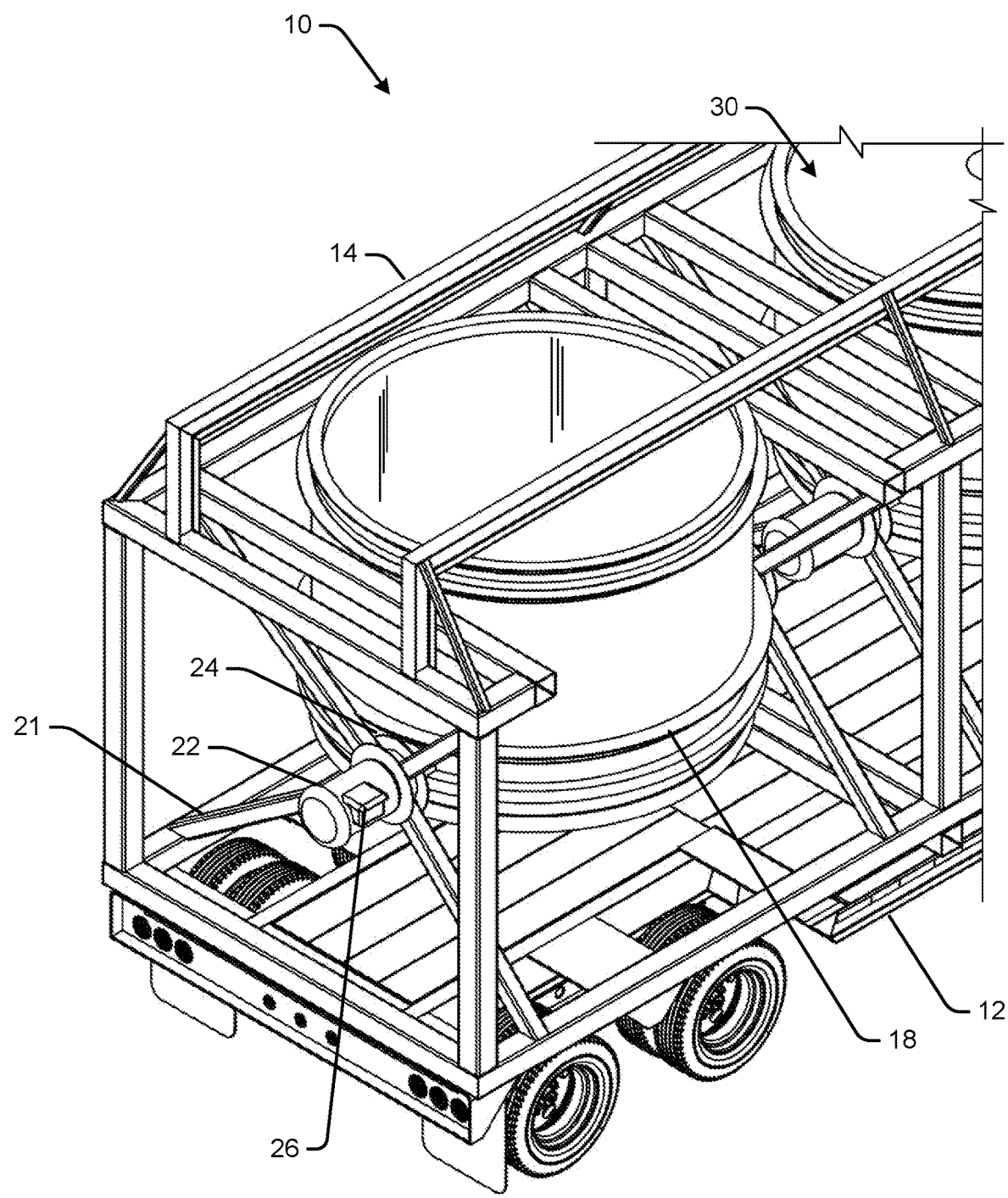
FIG. 7 is a close up view of the example mobile kiln system showing the first kiln in an upright position.
Figure 8:
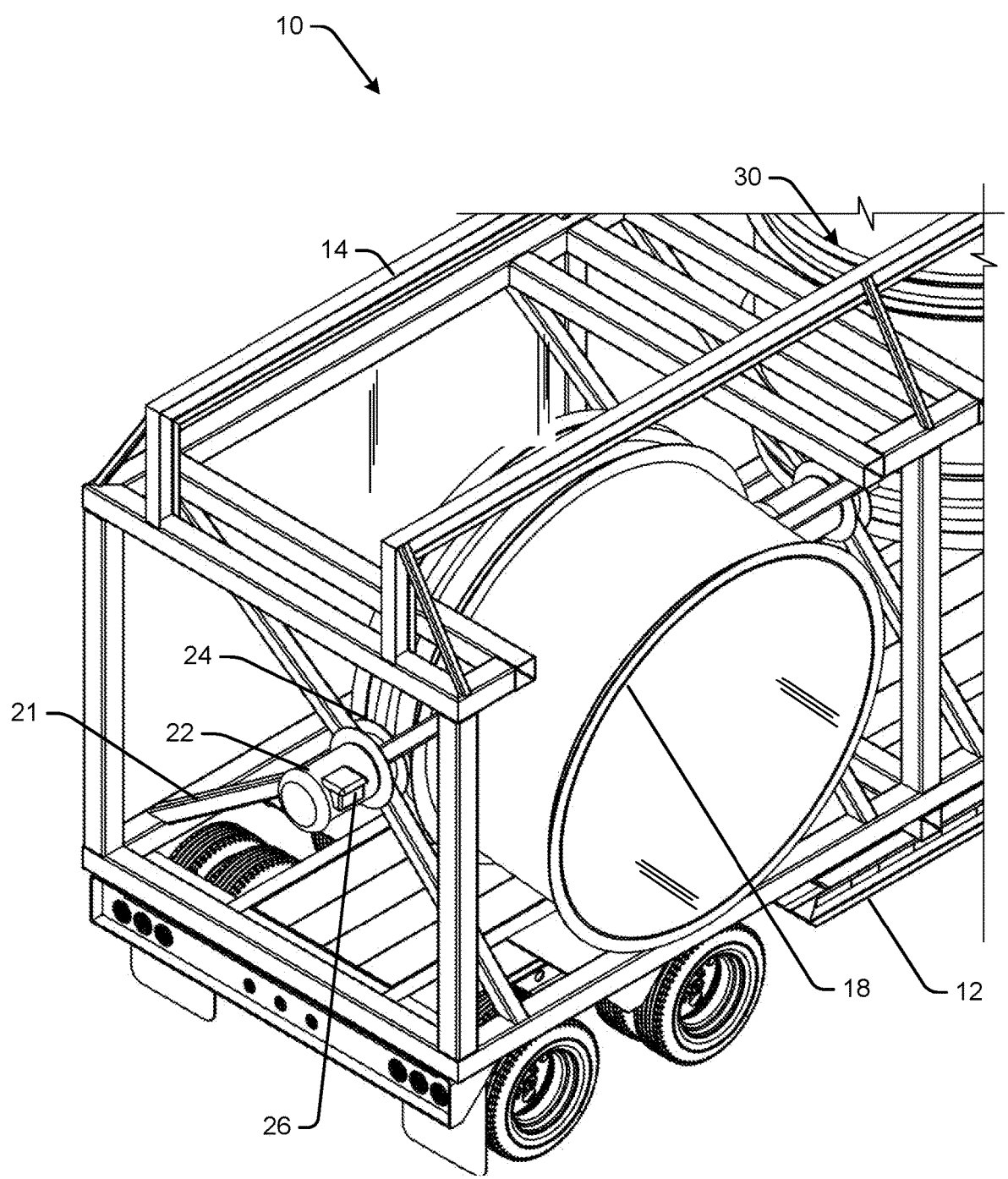
FIG. 8 is a close up view of the example mobile kiln system showing the first kiln in a tipped position.

FIG. 5 is a perspective view of the example mobile kiln system 10 showing the first kiln 18 in a tipped position to empty biochar from the first kiln 18. Biochar may be emptied onto the ground, e.g., for pickup using a frontend loader, or emptied directly into a transporter (e.g., frontend loader, truck, railcar, etc.). FIG. 6 is a back view of the example mobile kiln system 10 corresponding to FIG. 5. FIG. 7 is a close up view of the example mobile kiln system 10 showing the first kiln 18 in an upright position to load with feedstock and processing operations. FIG. 8 is a close up view of the example mobile kiln system 10 showing the first kiln 18 in a tipped position to empty processed biochar.

In this example, the kilns 18 are pivoted from a middle pin 22 on the frame 14 to enable the kiln 18 to tip and dump from the trailer or frame 14. An automated system enables emptying the kilns 18 with little to no human involvement, making the mobile kiln system fully or at least partly automated. In addition, no external equipment is necessary for the dumping of the kilns 18, making the mobile kiln system 10 fully or at least partly self-contained. An automated system enables the entire process, from burn, dump and moving the stack assemblies 30 during the production of char material with little to no human interaction, with the use for little or no external equipment.

The operations shown and described herein are provided to illustrate example implementations. It is noted that the operations are not limited to the ordering shown. Still other operations may also be implemented.

It is noted that the examples shown and described are provided for purposes of illustration and are not intended to be limiting. Still other examples are also contemplated.

The invention claimed is:

1. A mobile kiln system, comprising:
a mobile platform;
a frame mounted to the mobile platform;
at least one kiln rotatably mounted to the frame, the at least one kiln movable between a first operational position for loading a feed material into the at least one kiln, and a second operational position for unloading a biochar product from the at least one kiln following processing of the feed material;
wherein the at least one kiln rotatably mounted to the frame includes a plurality of kilns rotatably mounted to the frame; and
a single stack assembly provided on a guide track to move between the plurality of kilns mounted to the frame.

2. The mobile kiln system of claim 1, further comprising at least one stack assembly for the at least one kiln, the at least one stack assembly having a lid to cover the kiln to retain heat and a chimney to release emissions from the kiln during processing of the feed material.

3. The mobile kiln system of claim 2, wherein the at least one stack assembly is positionable on the at least one kiln in an operating configuration and a transport configuration, wherein the chimney moves about 180 degrees between the operating configuration and the transport configuration.

4. The mobile kiln system of claim 1, wherein the at least one kiln rotatably mounted to the frame includes a plurality of kilns rotatably mounted to the frame, and wherein the system further comprises a dedicated stack assembly which serves as a stack assembly for each of the plurality of kilns rotatably mounted to the frame.

5. The mobile kiln system of claim 1, wherein the guide track comprises at least one rail and a corresponding rail engagement device.

6. The mobile kiln system of claim 5, wherein the corresponding rail engagement device comprises at least one wheel to roll on the at least one rail.

7. The mobile kiln system of claim 5, wherein the corresponding rail engagement device comprises at least one slider to slide on the at least one rail.

8. The mobile kiln system of claim 1, further comprising a drive mechanism to automatically move the single stack assembly between the plurality of kilns.

9. The mobile kiln system of claim 8, wherein the drive mechanism comprises a motor and drive chain or drive belt.

10. The mobile kiln system of claim 1, wherein the mobile platform is a flatbed truck or trailer.

11. The mobile kiln system of claim 1, wherein the frame and the at least one kiln are removable from the mobile platform, wherein the at least one kiln remains fully operational for biochar production when apart from the mobile platform.

12. The mobile kiln system of claim 1, further comprising an elevated support axis rotatably mounting the at least one kiln to the frame, the elevated support axis supporting the at least one kiln on the frame in the first operational position and the second operational position.

13. The mobile kiln system of claim 12, further comprising a drive system to rotate the at least one kiln on the elevated support axis between the first operational position and the second operational position.

14. The mobile kiln system of claim 1, further comprising a fuel supply connected to the at least one kiln during a burn phase of biochar production.

15. A mobile kiln system, comprising:
a mobile platform;
a frame mounted to the mobile platform;
at least one kiln suspended from the frame, the at least one kiln mounted on a support axis to the frame to rotate between a first operational position for loading a feed material into the at least one kiln, and a second operational position for unloading a biochar product from the at least one kiln following processing of the feed material;
wherein the at least one kiln suspended from the frame includes a plurality of kilns suspended from the frame; and
a single stack assembly provided on a guide track to move between the plurality of kilns suspended from the frame.

16. The mobile kiln system of claim 15, further comprising at least one stack assembly for the at least one kiln, the at least one stack assembly having a lid to cover the kiln to retain heat and a chimney to release emissions from the kiln during processing of the feed material.

17. The mobile kiln system of claim 15, further comprising a drive system to rotate the at least one kiln on the elevated support axis between the first operational position and the second operational position.

18. The mobile kiln system of claim 15, further comprising a fuel supply connected to the at least one kiln during a burn phase of biochar production.

19. An automated mobile kiln system, comprising:
a mobile platform;
a frame mounted to the mobile platform;
a plurality of kilns suspended from the frame, each of the kilns mounted on a support axis to the frame to rotate between a first operational position for loading a feed material into the kilns, and a second operational position for unloading a biochar product from the kilns following processing of the feed material;
a single stack assembly provided on a guide track to move between the plurality of kilns suspended from the frame; and
a drive system configured to automatically process burned feed material following a cooling cycle by independently emptying the kilns and resetting the kilns for processing new feedstock.

* * * * *